(12) United States Patent
Ikeda

(10) Patent No.: US 7,378,175 B2
(45) Date of Patent: May 27, 2008

(54) FUEL CELL AND SMALL ELECTRIC EQUIPMENT

(75) Inventor: Sotomitsu Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 10/851,106

(22) Filed: May 24, 2004

(65) Prior Publication Data

US 2004/0241526 A1 Dec. 2, 2004

(30) Foreign Application Priority Data

May 30, 2003 (JP) ............................ 2003-154869

(51) Int. Cl.
*H01M 2/08* (2006.01)
*H01M 2/14* (2006.01)

(52) U.S. Cl. .............................. 429/34; 429/38; 429/39
(58) Field of Classification Search ...................... None
See application file for complete search history.

(56) References Cited

U.S. PATENT DOCUMENTS

| | | | | |
|---|---|---|---|---|
| 4,037,023 A | * | 7/1977 | Grehier et al. | 429/12 |
| 4,064,321 A | * | 12/1977 | Grehier | 429/34 |
| 4,649,091 A | | 3/1987 | McElroy | 429/34 |
| 4,652,504 A | * | 3/1987 | Ando | 429/105 |
| 4,678,724 A | | 7/1987 | McElroy | 429/34 |
| 5,049,458 A | * | 9/1991 | Sato et al. | 429/32 |
| 5,234,776 A | * | 8/1993 | Koseki | 429/30 |

FOREIGN PATENT DOCUMENTS

| | | | |
|---|---|---|---|
| JP | 04-25673 | | 5/1992 |
| JP | 2000-58100 | * | 2/2000 |

* cited by examiner

*Primary Examiner*—Patrick Ryan
*Assistant Examiner*—Julian Mercado
(74) *Attorney, Agent, or Firm*—Fitzpatrick, Cella, Harper & Scinto

(57) ABSTRACT

A highly efficient fuel cell is provided that can be reduced in size and provide a large electromotive force and that comprises an electrolyte/electrode joined member comprising a fuel electrode, an oxidizer electrode, and an electrolyte membrane provided between the electrodes, wherein a plurality of spacers are provided at least on a surface on the oxidizer electrode side of the electrolyte/electrode joined member.

6 Claims, 3 Drawing Sheets

FUEL CELL AND SMALL ELECTRIC EQUIPMENT

BACKGROUND OF THE INVENTION

1. Field of the Invention

The present invention relates to a fuel cell for generating an electric power by the reaction of fuel with an oxidizer. Further, the present invention relates to a small electric equipment using the fuel cell.

2. Related Background Art

A fuel cell uses an electrolyte/electrode joined member, which is composed of an electrolyte membrane sandwiched between a fuel electrode having a catalyst and an oxidizer electrode having a catalyst, as a power generation cell unit. In the electrolyte/electrode joined member, a fuel gas such as a hydrogen gas is caused to flow on the fuel electrode side while an oxidizing gas containing an oxygen gas is caused to flow on the oxidizer electrode side, and these gases electrochemically react with each other through the electrolyte membrane to provide an electromotive force to the outside. Since a single electrolyte/electrode joined member has a small electromotive force of about 0.7 to 0.8 V, a plurality of electrolyte/electrode joined members are connected in series to be used in many cases.

For example, FIG. 3 shows a sectional view of a conventional fuel cell. Electrolyte/electrode joined members, each of which is composed of an electrolyte membrane 31 having a fuel electrode 32 and an oxidizer electrode 33 on the opposite surfaces thereof, are stacked such that the fuel electrodes 32 face the oxidizer electrodes 33, and conductive separators 34 are inserted between the electrolyte/electrode joined members so as to connect the electrolyte/electrode joined members in series. Further, in each separator 34, an oxidizing gas flow path, which supplies an oxidizing gas to an adjacent oxidizer electrode, and a fuel gas flow path, which supplies a fuel gas to an adjacent fuel electrode are formed, respectively. In this case, the oxidizing gas is supplied by taking in air from the atmosphere through a perforated housing 37, and the fuel is supplied from a fuel storage unit. As described above, the conventional separator has the function of separating the fuel from the oxidizer and the function of a spacer for securing a space for supplying the fuel gas and the oxidizing gas.

For example, Japanese Patent Publication No. H04-25673 (page 205, FIG. 3) discloses a configuration such that a plurality of cells are connected in series through a separator composed of a conductive plate having conductive projections. The conductive projections establish parallel flow paths for fuel and an oxidizing gas over the surface of electrodes.

Further, there is proposed a trial for reducing the size of a fuel cell in which electrolyte/electrode joined members are stacked such that the fuel electrodes face each other or the oxidizer electrodes face each other (see Japanese Patent Application Laid-Open No. 2000-058100 (FIG. 1)).

However, the fuel cell having the stack structure disclosed in Japanese Patent Publication No. H04-25673 described above has a problem that the size of the fuel cell depends on the thickness of the separator and is large in a stack direction. Further, it is important for the separator to secure the flow paths of an oxidizer and fuel and to maximize a reacting electrode interface in order to improve the efficiency of the fuel cell. For this purpose, a contact interface between the separator and the electrodes needs to be reduced.

Further, Japanese Patent Application Laid-Open No. 2000-058100 proposes a trial for reducing the size of a fuel cell. For example, there is also proposed a fuel cell the size of which in a stack direction is reduced by stacking electrolyte/electrode joined members such that the fuel electrodes face each other or the oxidizer electrodes face each other and by inserting an insulating separator into each flow path, in which either one of an oxidizing gas flow path and a fuel gas flow path is formed, between the electrolyte/electrode joined members. The separator merely has a role of electrically isolating upper and lower electrodes and keeping a flow path space and therefore does not improve the power generation efficiency of the fuel cell.

Further, in the fuel cell, it is very difficult to accurately form a fine structure for oxidizer and fuel passages.

In view of the above circumstances, it is desirable to provide a fuel cell having a highly efficient electrode-stack structure that can be reduced in size and from which a large amount of electromotive force can be obtained.

Further, it is desirable to provide a small mobile electric equipment such as a digital camera, a digital video camera, a small projector, a small printer, a notebook personal computer, and the like using the fuel cell.

SUMMARY OF THE INVENTION

That is, the present invention is a fuel cell that comprises an electrolyte/electrode joined member comprising a fuel electrode, an oxidizer electrode, and an electrolyte membrane provided between the electrodes, wherein a plurality of spacers are provided at least on a surface on the oxidizer electrode side of the electrolyte/electrode joined member.

It is preferable that the spacer is a spherical spacer having a spherical shape.

It is preferable that the surface of the spherical spacer has a hydrophilicity higher than that of the surface of the electrolyte/electrode joined member.

Further, the present invention is a fuel cell that comprises a plurality of electrolyte/electrode joined members each comprising a fuel electrode, an oxidizer electrode, and an electrolyte membrane provided between the electrodes and stacked such that the same kind of electrodes face each other, wherein a plurality of spacers are provided at least on the oxidizer electrode side of each of the plurality of electrolyte/electrode joined members.

It is preferable that the plurality of spacers are provided between the oxidizer electrodes and between the fuel electrodes of the stack of the plurality of electrolyte/electrode joined members.

Further, the present invention is a small electric equipment having the fuel cell mounted thereon.

The electrolyte/electrode joined member in accordance with the present invention, which comprises a fuel electrode, an oxidizer electrode, and an electrolyte membrane, is characterized in that a plurality of spacers are provided dispersedly to be in contact with at least a surface on the oxidizer electrode side of the electrolyte/electrode joined member. At the oxidizer electrode, it is important to supply an oxidizing gas onto the electrolyte membrane and to remove generated water, and thus it is important to increase the area for the reaction thereof. In the present invention, since a plurality of small spacers, which are different from a conventional integral spacer that is complex and thick, are provided dispersedly, flow paths can easily be secured to enable fuel cells to be easily manufactured.

In particular, it is particularly preferable that the spacers each have an approximately spherical shape. In this case, there are advantages that the spacers come into contact with the electrolyte/electrode joined member in a small area and have an excellent buckling strength because of the spherical shape thereof, and that since the degree of freedom of positional accuracy when disposed is high, the assembly cost of the fuel cell is low. Further, disposing the spherical spacers can easily secure flow path spaces for fuel and an oxidizer, which can eliminate a conventional, difficult step of forming a flow path structure on a separator. In the light of the above description, it is also effective to further dispose the spherical spacers on a surface on the fuel electrode side of the electrolyte/electrode joined member. Moreover, the spherical spacers have an economical effect that they can be obtained at a low cost when spherical spacers generally used in a liquid crystal display are employed as such.

In the present invention, it is preferable that the surface of the spherical spacer has a hydrophilicity higher than that of the surface of the electrolyte/electrode joined member. As described above, the power generation will form water at the oxidizer electrode, and it is effective to remove the water to efficiently continue the reaction. Here, a surface having a higher hydrophilicity is advantageous in that, when water is in contact with a more hydrophilic surface and with a less hydrophilic surface, the contact angle of water with the more hydrophilic surface is smaller than that with the less hydrophilic surface, whereby the water will move to the more hydrophilic surface side by the effect of surface tension. When adopting this preferable feature of the present invention, since the more strongly hydrophilic surface of the spacer will increase the area of the surface that absorbs the generated water from the surface of the electrolyte/electrode joined member and keep and vaporize the water, the power generating efficiency of the fuel cell can be improved.

When the fuel cell of the present invention has an electrode/electrolyte membrane stack structure in which at least two electrolyte/electrode joined members are stacked, they are stacked such that the same kind of electrodes face each other on the oxidizer electrode side thereof through the spherical spacers. With the above arrangement, since the oxidizer electrodes face each other and the fuel electrodes face each other, a separator structure for separating gases is not necessary, so that the thickness of the electrode/electrolyte membrane stack structure can be reduced. Further, the voltage/current of the output power can be freely controlled by connecting the electrolyte/electrode joined members in series or in parallel in a predetermined fashion.

Other features and advantages of the present invention will be apparent from the following description taken in conjunction with the accompanying drawings.

DESCRIPTION OF THE PREFERRED EMBODIMENTS

Preferred embodiments of the present invention will be described below with reference to the drawings.

Figure 1:
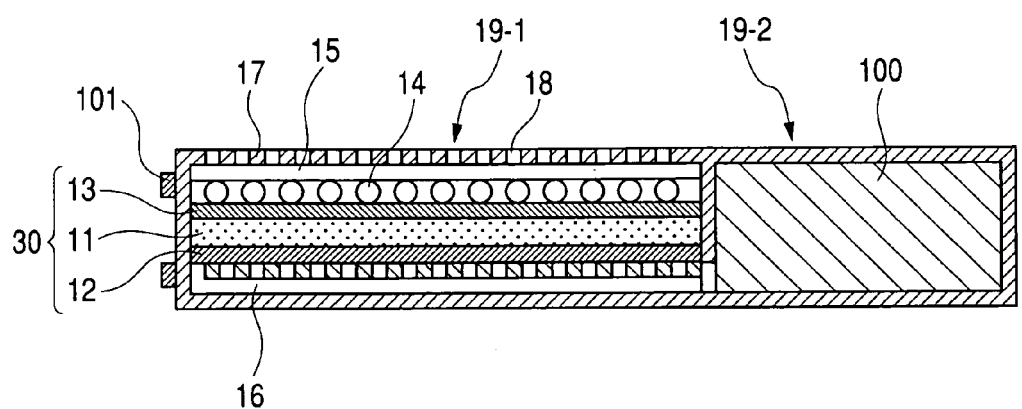
FIG. 1 is a schematic sectional view of a fuel cell according to Example 1 of the present invention.

FIG. 1 is a schematic sectional view showing a structure of a fuel cell according to a first embodiment of the present invention. The fuel cell includes at least a cell unit (hereinafter, sometimes simply referred to as "fuel cell body") 19-1 having an electrolyte/electrode joined member 30 and a fuel unit 19-2 in which fuel is stored.

In FIG. 1, the electrolyte/electrode joined member 30 has an oxidizer electrode 13 having a catalyst on the upper surface of an electrolyte membrane 11 and a fuel electrode 12 having a catalyst on the lower surface of the electrolyte membrane 11. Further, the electrolyte/electrode joined member 30 has spherical (bead) spacers 14 on the upper surface of the oxidizer electrode 13 and a separator 16 having a fuel flow path on the lower surface of the fuel electrode 12. Further, a housing 17 of the cell unit having the electrolyte/electrode joined member has holes 18 made on the oxidizer electrode side for taking in air, and an oxidizing gas/water permeable membrane 15 is provided between the housing 17 and the spherical spacers 14. Reference numeral 100 denotes a fuel and 101 denotes an electric power taking out terminal.

As the electrolyte membrane 11, there may be used a perfluorocarbon, non-perfluoro, hybrid ion-exchange membrane or the like. In particular, a perfluorosulfonic acid electrolyte membrane, a perfluorocarboxylic acid membrane, a styrene(vinyl benzene) membrane, a quaternary ammonium anion exchange membrane, and the like can be appropriately selected and used. Further, a membrane formed of, for example, benzimidazole polymers coordinated with phosphoric acid and a membrane formed of polyacrylic acid impregnated with a concentrated potassium hydroxide solution are also effective as the electrolyte membrane.

As commercial products, "Nafion" of DuPont, "Flemion" of Asahi Glass, "Aciplex" of Asahi Chemical, and the like are commercially available. The electrolyte membrane of the present invention is not particularly limited as long as it is a polymer electrolyte membrane and has a high protonic conductivity, chemical and electrochemical stability, gas impermeability, and a mechanical strength.

As the catalysts of the fuel electrode and the oxidizer electrode, there may preferably be used a platinum group metal such as platinum, rhodium, palladium, ruthenium, iridium, etc., an iron group metal such as iron, cobalt, nickel, etc., or an alloy thereof, and at least one of these metals is deposited to and fixed on the surfaces of the polymer membrane on both the electrode sides thereof by chemical plating or the like. These catalysts can be also fixed by coating or pressure-bonding metal powder on the surfaces of the membrane. Further, there is also a method of dispersing the catalyst metal on surfaces of carbon particles in a microparticulate state and fixing the catalyst-carrying carbon particles on the surfaces of the polymer membrane.

As described above, as to the types and the carrying amounts of the catalysts of the fuel electrode and the oxidizer electrode, and as to the method of carrying the catalysts, conventional techniques used to constitute a solid polymer type fuel cell, and conventional techniques used to constitute electrodes for water electrolysis using a solid polymer membrane may be as such employed.

As the oxidizer electrode, there are used those materials having conductivity and gas permeability such as a porous metal thin film, a conductive carbon thin film, and the like.

As the fuel electrode, there are used those conductors having gas permeability and a low resistance such as porous metal, conductive carbon, and the like.

The fuel is brought into contact in a gaseous or liquid state with the fuel electrode. Although the fuel may be continuously or intermittently supplied, it may be filled in a space on the fuel electrode side.

Although the oxidizer is supplied to the oxidizer electrode side through the gas permeable membrane from the atmosphere, an oxidizing gas storage unit may be provided to supply the oxidizer therefrom.

Next, the spherical spacers as a principal feature of the present invention will be explained.

The spherical spacers have diameters of, for example, several micrometers to several tens of micrometers and the dispersion thereof represented in terms of standard deviation/average particle diameter is as small as several % to show a high dimensional accuracy. As the materials, those having an insulation property such as silica, resin, and the like are basically used. As such spherical spacers, for example, spherical spacers for use in a liquid crystal display may preferably be used.

As a method of spraying the spacers, a wet spray method or a dry spray method may be used. For example, the wet spray method and dry spray method that are used to manufacture an ordinary liquid crystal display may be adopted. The spray density represented in terms of an occupied area ratio ranges from several % to 91% that is attained by in-plane close packing. When the spacers are spherical beads having diameters of several micrometers to several tens of micrometers, it is possible to spray them in the number of several hundreds to several tens of thousands per 1 $mm^2$. In particular, it is desirable to spray them in the number of about one to ten thousands per 1 $mm^2$. Further, the methods of providing the surface of the spacer with hydrophilicity are not particularly limited and include, for example, a method of covering the surface with a hydrophilic material and a method of irradiating the surface with an electron beam, UV ray, or the like in an appropriate atmosphere.

The fuel cell of the present invention is advantageous in that the output density is high, and that the operating temperature is as low as 100° C. or less, whereby long-term durability is expectable and the handling is easy, and can therefore be utilized for portable equipments such as mobile phones, cameras, video cameras, notebook personal computers, and the like or as a mobile power supply. Incidentally, it should be noted that the fuel cell of present invention is characterized in that the spherical spacers are disposed at least on the oxidizer electrode side, and no restriction is imposed on the design of the fuel cell such as selection of catalysts, a method of forming catalyst layers, structure of electrodes for current collection, selection of fuel, a method of supplying fuel and air, and the like.

The present invention will be specifically described with reference to examples thereof.

EXAMPLE 1

FIG. 1 shows a sectional view of a fuel cell as a first example of the present invention. The fuel cell includes at least a cell unit (fuel cell body) 19-1 having an electrolyte/electrode joined member 30, a fuel unit 19-2 for storing a fuel 100, and power taking out terminals 101.

In FIG. 1, the electrolyte/electrode joined member 30 includes an oxidizer electrode 13 having a catalyst on the upper surface of an electrolyte membrane 11 and a fuel electrode 12 having a catalyst on the lower surface thereof. The electrolyte membrane 11 is composed of, for example, a polymeric material having a protonic conductivity, specifically Nafion (trade name; produced by DuPont).

The oxidizer electrode 13 and the fuel electrode 12 are composed of, for example, carbon powder containing platinum microparticles.

The electrolyte/electrode joined member 30 has spherical bead spacers 14 on the upper surface of the oxidizer electrode 13 and a separator 16 with a fuel flow path on the lower surface of the fuel electrode 12. As the spherical bead spacers 14, Micropearl (trade name; produced by SEKISUI CHEMICAL CO., LTD.) having a particle diameter of 8 μm is used and uniformly sprayed on the electrolyte/electrode joined member 30. About one thousand of spherical bead spacers are sprayed per 1 $mm^2$ using a spray method employed in an ordinary liquid crystal display manufacturing process.

The separator 16 with the fuel flow path provided on the fuel electrode 12 side forms a flow path groove of several μm in width and several μm in depth and serves as a fuel supply passage. Further, electrical conductivity is imparted to the fuel electrode 12 side to play a role as a current collector on the fuel electrode 12 side.

A housing 17 of the cell unit 19-1 having the electrolyte/electrode joined member 30 is provided on the oxidizer electrode 13 side thereof with a plurality of holes 18 through which air is taken in and water is removed. An oxidizer gas/water permeable membrane 15 is provided between the housing 17 and the spherical spacers 14. In this example, hydrogen is used as the fuel, oxygen is used as the oxidizer, and a hydrogen storage alloy is used as a material of the fuel storage unit.

With the fuel cell of this example that generates an electric power through a reaction of hydrogen and oxygen when connected to an external electrical load, the use of the spherical spacers makes it possible to increase the space of the flow path on the oxidizer electrode side thereby smoothly supplying oxygen, and making the surface of the spacers more hydrophilic than the surface of the electrolyte/electrode joined member enables water to be effectively removed. Further, the spherical spacers can reduce the area in which they come into contract with the electrolyte/electrode joined member. With these effects, a greater amount of power can be obtained as compared with a case when a conventional separator is used.

EXAMPLE 2

Figure 2:
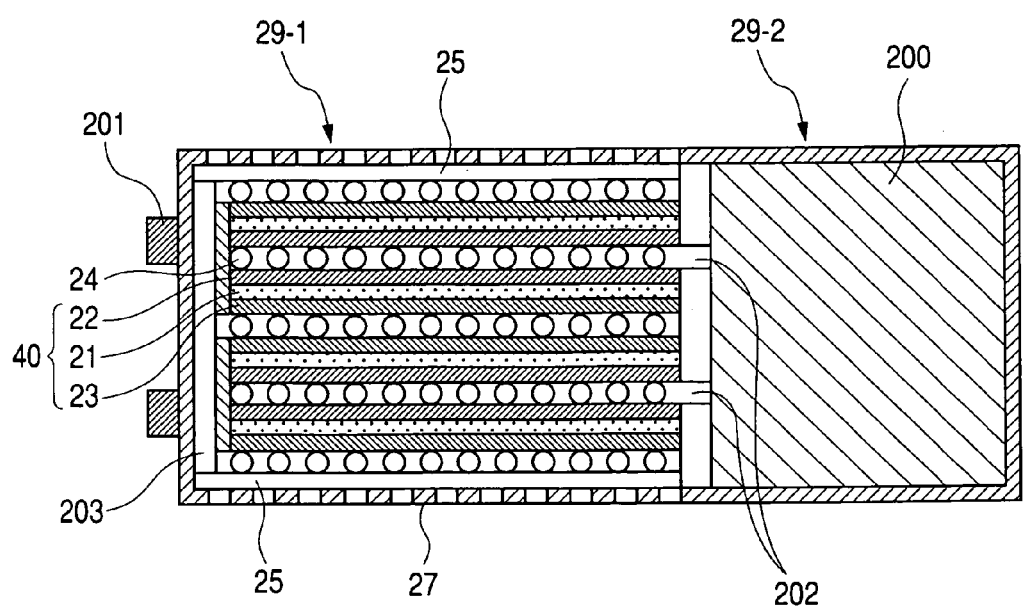
FIG. 2 is a schematic sectional view of a fuel cell according to Example 2 of the present invention.
Figure 3:
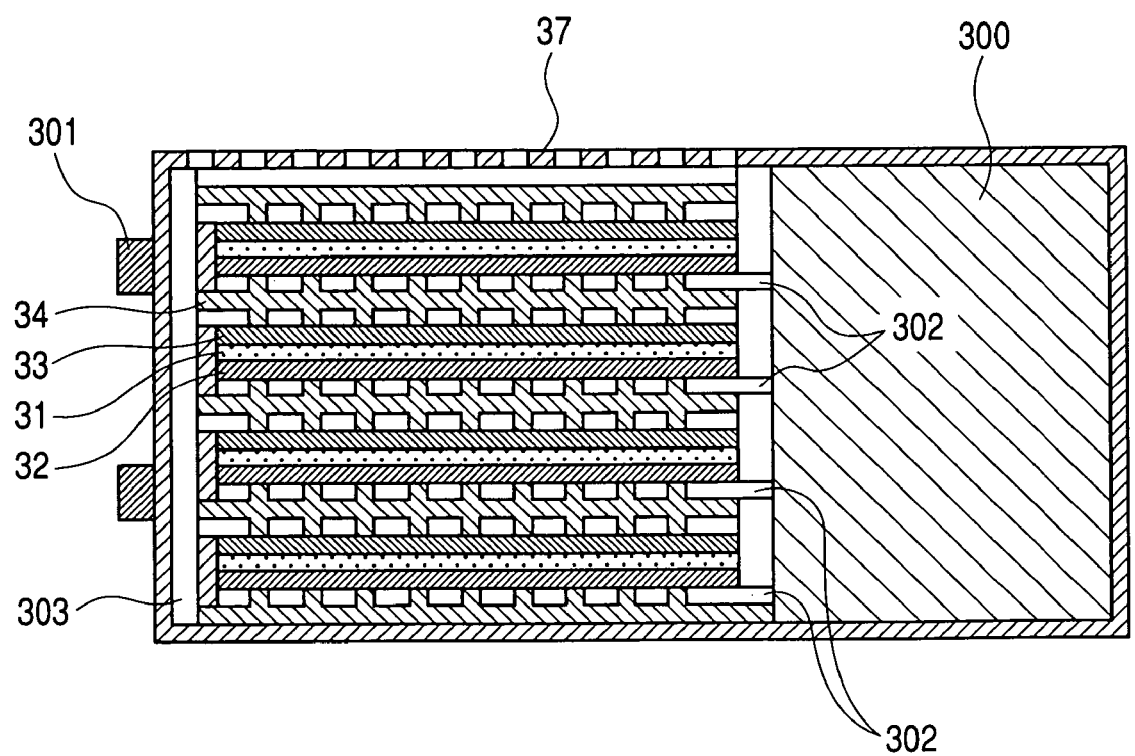
FIG. 3 is a schematic sectional view of a conventional fuel cell.

FIG. 2 shows a sectional view of a fuel cell as a second example of the present invention. The fuel cell includes at least a cell unit 29-1 having electrolyte/electrode joined members 40, a fuel unit 29-2 for storing a fuel 200, and power take-out terminals 201. The stack fuel cell of this example is characterized in that electrodes are disposed such that the same kind of electrodes (that is, fuel electrodes or oxidizer electrodes) face each other, which eliminates the necessity of a separator for separating fuel from an oxidizer. That is, oxidizing gas flow paths for flowing an oxidizing gas containing oxygen flow are formed between the electrolyte/electrode joined members where positive electrodes face each other, and fuel gas flow paths for flowing a fuel gas containing hydrogen are formed between the electrolyte/electrode joined members where negative electrodes face each other. The spherical spacers as a principal feature of the present invention support each of the electrolyte/electrode joined members, and openings for flowing the gases therethrough are provided at the both ends of the stack in one direction.

In FIG. 2, as with FIG. 1, for example, an uppermost electrolyte/electrode joined member 40 includes an oxidizer electrode 23 having a catalyst on the upper surface of an electrolyte membrane 21 and a fuel electrode 22 having a catalyst on the lower surface thereof. The electrolyte membrane 21 is composed of, for example, a polymeric material having a protonic conductivity, specifically, Nafion (trade name; produced by DuPont). The oxidizer electrode 23 and the fuel electrode 22 are composed of, for example, carbon powder containing platinum microparticles. Reference numeral 27 denotes a housing with through-holes.

The uppermost electrolyte/electrode joined member 40 has spherical bead spacers 24 on the upper surface of the oxidizer electrode 23 and a fuel flow path 202 on the lower surface of the fuel electrode 22. As the spherical bead spacers 24, Micropearl (trade name; produced by SEKISUI CHEMICAL CO., LTD.) having a particle diameter of 8 μm is used and uniformly sprayed on the electrolyte/electrode joined member 40.

Outside the electrolyte/electrode joined members 40 located on the both ends in the stack direction, there are disposed oxygen/water permeable membranes, respectively. With the above arrangement, the oxidizer is supplied to the electrolyte/electrode joined members 40 and water generated therein is discharged therefrom. To supply the oxidizer to and to discharge water from the electrolyte/electrode joined members 40 located inside in the stack direction, oxidizer flow paths 203, which are supported by spherical spacers 24, are formed adjacent to the oxidizer electrodes 23 of the electrolyte/electrode joined members 40, and an oxidizer flow path 203, which is spatially connected to the oxidizer flow paths 203, is located vertically on the left side of FIG. 2. As to the fuel, fuel flow paths 202, which are supported by spherical spacers 24, are formed adjacent to the fuel electrodes 22 of the electrolyte/electrode joined members 40 and connected to the fuel unit 29-2.

Since the spacers are spherical, the contact area of the spacers with the electrolyte/electrode joined members is small, thus increasing the contact area of the oxidizing gas or the fuel gas with the electrolyte/electrode joined members.

Further, the electrolyte/electrode joined members are connected in series or parallel to each other so that a desired voltage and current can be obtained, by electrically connecting positive and negative electrodes through wiring (not shown).

The fuel cell of the above-described structure can be produced as follows. First, a fuel electrode and an oxidizer electrode are formed on the opposite sides of an electrolyte membrane to form an electrolyte/electrode joined member. Next, spherical spacers are interposed between the thus formed electrolyte/electrode joined members, and the electrolyte/electrode joined members are stacked, respectively. At that time, the electrolyte/electrode joined members are arranged such that the same kind of electrodes face each other. Incidentally, since the fuel electrode and the oxidizer electrode have the same structure here, the direction of stack of each electrolyte/electrode joined member is not particularly limited. Subsequently, gas supply flow paths to the thus stacked electrolyte/electrode joined members are disposed, respectively.

Oxidizer flow paths and fuel flow paths are fixed so as to supply respective gases. Thereafter, the positive electrodes and negative electrodes of the electrolyte/electrode joined members are electrically connected in series and in parallel to each other through wiring (not shown). Thus, the fuel cell shown in FIG. 2 is formed.

The fuel cell operates as follows.

In the fuel cell, an oxidizing gas containing oxygen is supplied to the oxidizer electrode sides of the electrolyte/electrode joined members through the oxidizing gas flow paths, and a fuel gas containing hydrogen is supplied to the fuel electrode sides thereof through the fuel gas flow paths. Thus, oxygen and hydrogen react with each other through the electrolyte membranes in the electrolyte/electrode joined members, thereby generating an electric power. Since the electrolyte/electrode joined members are disposed such that the same kind of electrodes face each other, the oxidizing gas is supplied to adjacent electrolyte/electrode joined members through the same oxidizing gas flow path, or the fuel gas is supplied thereto through the same fuel gas flow path. Further, since the electrolyte/electrode joined members are connected in series through wiring, a great electromotive force can be obtained.

As described above, according to the fuel cell of the present example, since the electrolyte/electrode joined members are stacked such that the same kind of electrodes face each other, it is only necessary to alternately form either one of the oxidizing gas flow path and the fuel gas flow path between the electrolyte/electrode joined members, so that the distances between the electrolyte/electrode joined members can be reduced. As a result, the size in the stack direction of the fuel cell can be reduced.

EXAMPLE 3

Figure 4:
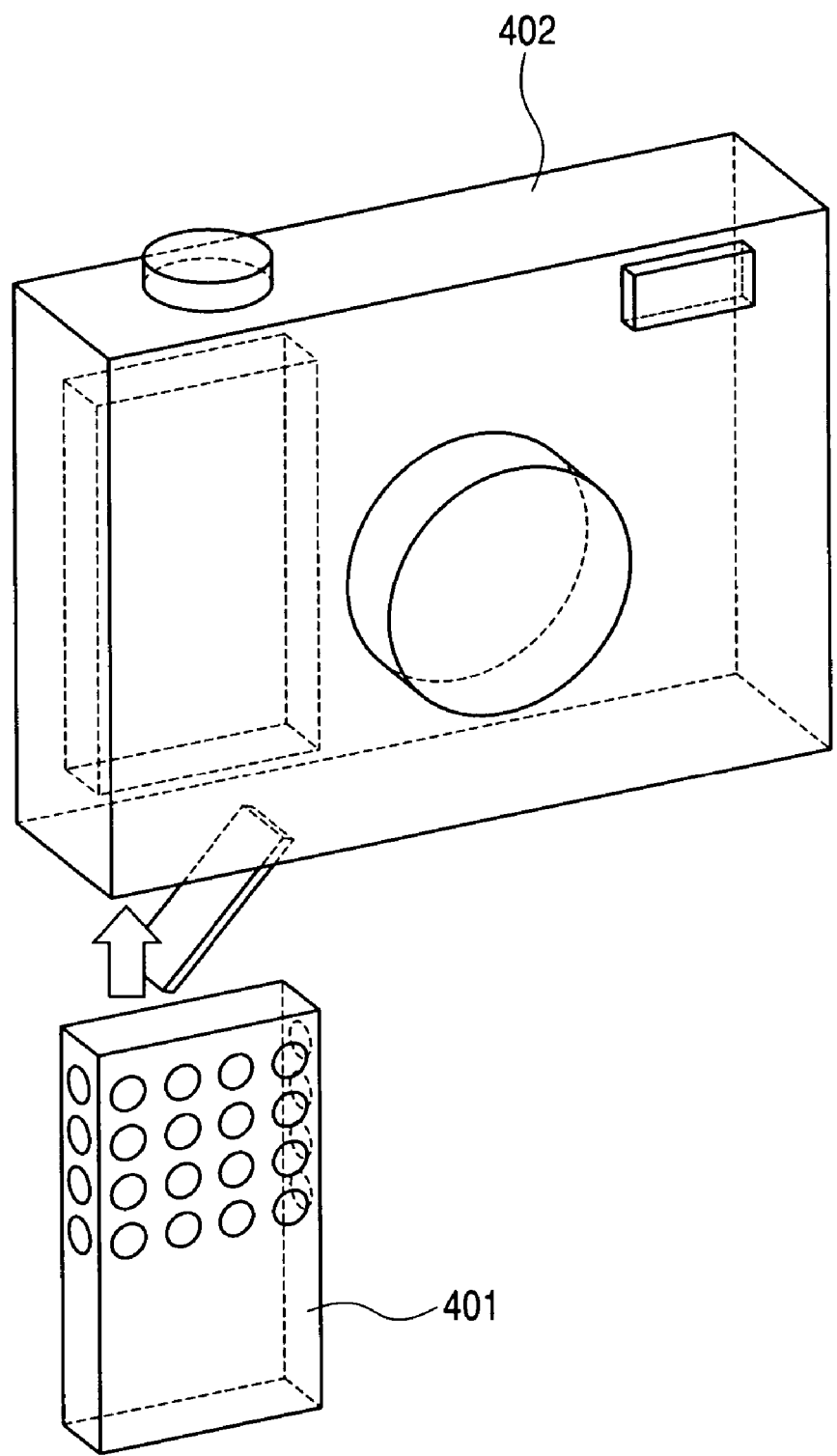
FIG. 4 is a schematic view of a digital camera using the fuel cell of the present invention.

FIG. 4 shows a schematic view of a digital camera using the fuel cell of the present invention.

As described above with reference to FIG. 1, a fuel cell 401 includes a cell unit having an electrolyte/electrode joined member and a fuel unit for storing a fuel, and holes formed in the surface of the fuel cell in FIG. 4 are used to take in air therethrough.

The fuel cell of the present invention is advantageous in that the output density is high; the operating temperature is as low as 100° C. or less, whereby long-term durability is expectable; it is suitable for miniaturization; and the handling is easy, and can therefore be utilized for portable equipments such as mobile phones, cameras, video cameras, notebook personal computers, and the like or as a mobile power supply. Accordingly, small electric equipments using the fuel cell of the present invention can be reduced in size/weight and can be used for a long period of time.

That is, the fuel cell of the present invention can preferably be used in small portable electric equipments such as digital cameras, digital video cameras, small projectors, small printers, notebook personal computers, and the like.

As described above, in the present invention, by using a plurality of spherical spacers, it is possible to reduce the contact area of the spacers with the electrolyte/electrode joined members, and when a gas is brought into contact with the positive or negative electrodes of the electrolyte/electrode joined members, the contact area of the joined members with the gas can be increased. Further, since the oxidizing gas or the fuel gas can flow smoothly therethrough, the thickness of the stack of the electrolyte/electrode joined members can be reduced. Further, when those spherical spacers that are employed in liquid crystal displays are used as such, those spherical members and production apparatuses thereof are easily available, so that production cost reduction can be realized.

Further, in the present invention, by using spherical spacers having more hydrophilic surfaces, it becomes possible to remove water generated at the oxidizer electrodes as a result of power generation from the surfaces of the electrolyte membranes. As a result, the oxidizer is smoothly supplied, whereby a good power generation efficiency can be maintained for a long period of time.

Further, according to the electrode stack structure of the present invention, since the electrolyte/electrode joined members are stacked such that the same kind of electrodes face each other, when, for example, a gas flow path is formed between the electrolyte/electrode joined members, the distance between the electrolyte/electrode joined members them can be reduced. As a result, the size of the stack of the electrolyte/electrode joined members can be reduced in the stack direction. Further, since the electrolyte/electrode joined members are electrically connected in series by wiring, a great electromotive force can be obtained, and further when a gas is brought into contact with the positive or negative electrodes of the electrolyte/electrode joined members, the contact area of the gas with the joined members can be increased. Accordingly, there can further be achieved an effect that the size of the stack of the electrolyte/electrode joined members can also be reduced in a direction perpendicular to the stack direction.

Further, there can be achieved an effect that small electric equipments using the fuel cell of the present invention can be reduced in size/weight and can be driven for a long period of time.

What is claimed is:

1. A fuel cell comprising an electrolyte/electrode joined member comprising a fuel electrode, an oxidizer electrode, and an electrolyte membrane provided between the electrodes,
    wherein a plurality of spherical bead-shaped spacers are provided at least on a surface on an oxidizer electrode side of the electrolyte/electrode joined member,
    wherein the plurality of spherical bead-shaped spacers are in contact with a surface of the oxidizer electrode, and
    wherein a surface of a spherical bead-shaped spacer is more hydrophilic than a surface of the electrolyte/electrode joined member.

2. A fuel cell comprising a plurality of electrolyte/electrode joined members each comprising a fuel electrode, an oxidizer electrode, and an electrolyte membrane provided between the electrodes and stacked such that the same kind of electrodes face each other,
    wherein a plurality of spherical bead-shaped spacers are provided at least on an oxidizer electrode side of each of the plurality of electrolyte/electrode joined members,
    wherein the plurality of spherical bead-shaped spacers are in contact with a surface of the oxidizer electrode, and
    wherein a surface of a spherical bead-shaped spacer is more hydrophilic than a surface of the electrolyte/electrode joined member.

3. A fuel cell comprising an electrolyte/electrode joined member comprising a fuel electrode, an oxidizer electrode, and an electrolyte membrane provided between the electrodes,
    wherein a plurality of spherical bead-shaped spacers are provided at least on a surface on an oxidizer electrode side of the electrolyte/electrode joined member,
    wherein the plurality of spherical bead-shaped spacers are in contact with a surface of the oxidizer electrode, and
    wherein the spherical bead-shaped spacers are electrically insulating.

4. A fuel cell comprising an electrolyte/electrode joined member comprising a fuel electrode, an oxidizer electrode, and an electrolyte membrane provided between the electrodes,
    wherein a plurality of spherical bead-shaped spacers are provided at least on a surface on an oxidizer electrode side of the electrolyte/electrode joined member,
    wherein the plurality of spherical bead-shaped spacers are in contact with a surface of the oxidizer electrode, and
    wherein the spherical bead-shaped spacers are present at a density of 1 to 10,000 per 1 $mm^2$.

5. A fuel cell comprising a plurality of electrolyte/electrode joined members each comprising a fuel electrode, an oxidizer electrode, and an electrolyte membrane provided between the electrodes and stacked such that the same kind of electrodes face each other,
    wherein a plurality of spherical bead-shaped spacers are provided at least on an oxidizer electrode side of each of the plurality of electrolyte/electrode joined members,
    wherein the plurality of spherical bead-shaped spacers are in contact with a surface of the oxidizer electrode, and
    wherein the spherical bead-shaped spacers are electrically insulating.

6. A fuel cell comprising a plurality of electrolyte/electrode joined members each comprising a fuel electrode, an oxidizer electrode, and an electrolyte membrane provided between the electrodes and stacked such that the same kind of electrodes face each other,
    wherein a plurality of spherical bead-shaped spacers are provided at least on an oxidizer electrode side of each of the plurality of electrolyte/electrode joined members,
    wherein the plurality of spherical bead-shaped spacers are in contact with a surface of the oxidizer electrode, and
    wherein the spherical bead-shaped spacers are present at a density of 1 to 10,000 per 1 $mm^2$.

* * * * *